US012008961B2

(12) United States Patent
Hwang

(10) Patent No.: US 12,008,961 B2

(45) Date of Patent: Jun. 11, 2024

(54) DISPLAY DEVICE AND ELECTRONIC APPARATUS INCLUDING THE SAME

(71) Applicant: Samsung Display Co., Ltd., Yongin-si (KR)

(72) Inventor: Moonsang Hwang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/119,513

(22) Filed: Mar. 9, 2023

(65) Prior Publication Data

US 2024/0021155 A1 Jan. 18, 2024

(30) Foreign Application Priority Data

Jul. 13, 2022 (KR) ........................ 10-2022-0086264

(51) Int. Cl.

*G09G 3/3233* (2016.01)
*G09G 3/3266* (2016.01)
*G09G 3/3275* (2016.01)

(52) U.S. Cl.

CPC ......... *G09G 3/3233* (2013.01); *G09G 3/3266* (2013.01); *G09G 3/3275* (2013.01); *G09G 2300/0439* (2013.01); *G09G 2300/0452* (2013.01); *G09G 2300/0819* (2013.01); *G09G 2300/0842* (2013.01); *G09G 2310/0291* (2013.01); *G09G 2310/0297* (2013.01); *G09G 2320/0285* (2013.01); *G09G 2360/14* (2013.01)

(58) Field of Classification Search

CPC .. G09G 3/3275; G09G 3/3266; G09G 3/3233; G09G 2300/0452; G09G 2300/0819; G09G 2300/0439; G09G 2300/0842; G09G 2310/0291; G09G 2310/0297; G09G 2320/0285; G09G 2360/14

See application file for complete search history.

(56) References Cited

U.S. PATENT DOCUMENTS

| | | | | |
|---|---|---|---|---|
| 2020/0227508 A1* | 7/2020 | Kim | ..................... | H10K 59/121 |
| 2020/0394964 A1* | 12/2020 | Hyun | ................... | G09G 3/2007 |
| 2021/0020664 A1* | 1/2021 | Tan | ........................ | G06F 1/1605 |
| 2021/0118368 A1* | 4/2021 | In | .......................... | G09G 3/3275 |
| 2021/0312868 A1* | 10/2021 | Kim | ..................... | G09G 3/3266 |

FOREIGN PATENT DOCUMENTS

| | | | |
|---|---|---|---|
| KR | 101641901 | B1 | 7/2016 |
| KR | 1020210046910 | A | 4/2021 |
| KR | 1020210124599 | A | 10/2021 |
| KR | 1020220010152 | A | 1/2022 |

* cited by examiner

*Primary Examiner* — Jimmy H Nguyen

(74) *Attorney, Agent, or Firm* — CANTOR COLBURN LLP

(57) ABSTRACT

A display device includes: a display panel which includes a plurality of display areas having different pixel densities from each other, where each of the display areas includes a plurality of pixels; a gate driver, which provides a first gate signal and a second gate signal to each of the pixels; and a data driver, which provides data voltages to the pixels in an address-scan period and provides different bias voltages to the display areas, respectively, in a self-scan period following the address-scan period.

20 Claims, 17 Drawing Sheets

821

| DISPLAY AREA | POSITION INFORMATION |
|---|---|
| DA1 | INFO_P1 |
| DA2 | INFO_P2 |
| DA3 | INFO_P3 |
| ⋮ | ⋮ |
| DAn-1 | INFO_Pn-1 |
| DAn | INFO_Pn |

FIG. 11

822

| DISPLAY AREA | R | G | B |
|---|---|---|---|
| DA1 | VBIAS_R1 | VBIAS_G1 | VBIAS_B1 |
| DA2 | VBIAS_R2 | VBIAS_G2 | VBIAS_B2 |
| DA3 | VBIAS_R3 | VBIAS_G3 | VBIAS_B3 |
| ⋮ | ⋮ | ⋮ | ⋮ |
| DAn-1 | VBIAS_Rn-1 | VBIAS_Gn-1 | VBIAS_Bn-1 |
| DAn | VBIAS_Rn | VBIAS_Gn | VBIAS_Bn |

DISPLAY DEVICE AND ELECTRONIC APPARATUS INCLUDING THE SAME

This application claims priority to Korean Patent Application No. 10-2022-0086264 filed on Jul. 13, 2022, in and all the benefits accruing therefrom under 35 U.S.C. § 119, the content of which in its entirety is herein incorporated by reference.

BACKGROUND

1. Field

Embodiments relate to a display device. More particularly, embodiments relate to a display device applied to various electronic apparatuses and an electronic apparatus including the display device.

2. Description of the Related Art

A display device may include a plurality of pixels for emitting light, and may display an image by the light emitted from the pixels. Voltages for controlling light emission of the pixels may be provided to the pixels, respectively.

The display device may include display areas having different pixel densities. Although luminances of lights emitted from the pixels are the same, luminances of the display areas may be different when the pixel densities of the display areas are different. Accordingly, display quality of the display device may be degraded.

SUMMARY

Embodiments provide a display device having improved display quality.

Embodiments provide an electronic apparatus including the display device.

A display device according to embodiments includes: a display panel, which includes a plurality of display areas having different pixel densities from each other, where each of the display areas includes a plurality of pixels; a gate driver, which provides a first gate signal and a second gate signal to each of the pixels; and a data driver which provides data voltages to the pixels in an address-scan period and provides different bias voltages to the display areas, respectively, in a self-scan period following the address-scan period.

In an embodiment, the display panel may further include data lines which connect the pixels to the data driver, apply the data voltages to the pixels in the address-scan period, and apply the bias voltages to the pixels in the self-scan period.

In an embodiment, the data driver may include: a memory, which stores image data corresponding to the data voltages; a look-up table, which stores position information of the display areas and values of the bias voltages of the display areas corresponding to the bias voltages; a bias determiner, which determines bias data from the look-up table; a multiplexer, which selects the image data as output data in the address-scan period and selects the bias data as the output data in the self-scan period; a digital-to-analog converter, which converts the output data into data signals; and buffers, which output the data signals to the data lines, respectively.

In an embodiment, the look-up table may include: a display area position look-up table which stores the position information of the display areas; and a bias voltage look-up table, which stores the values of the bias voltages of the display areas.

In an embodiment, the position information of the display areas may include shapes of the display areas, sizes of the display areas, and points of the display areas.

In an embodiment, the values of the bias voltages of the display areas may include red values of the bias voltages with respect to a red pixel, green values of the bias voltages with respect to a green pixel, and blue values of the bias voltages with respect to a blue pixel.

In an embodiment, the data driver may further include a bias current controller, which controls a magnitude of a bias current provided to the buffers based on a change in the bias voltages provided to pixel rows of the pixels.

In an embodiment, the bias current controller may provide a first bias current to the buffers when the bias voltages provided to a current pixel row of the pixel rows are the same as the bias voltages provided to a previous pixel row of the pixel rows, and may provide a second bias current greater than the first bias current to the buffers when the bias voltages provided to the current pixel row are different from the bias voltages provided to the previous pixel row.

In an embodiment, at least one of the pixels may include a light emitting diode, a driving transistor which provides a driving current to the light emitting diode, and a write transistor connected between a first electrode of the driving transistor and one of the data lines, and turned on in response to the first gate signal.

In an embodiment, the write transistor may provide one of the data voltages to a gate electrode of the driving transistor in response to the first gate signal in the address-scan period, and may provide one of the bias voltages to the first electrode of the driving transistor in response to the first gate signal in the self-scan period.

In an embodiment, the at least one of the pixels may further include a bias transistor connected between the first electrode of the driving transistor and the one of the data lines, and turned on in response to the second gate signal.

In an embodiment, the write transistor may provide one of the data voltages to a gate electrode of the driving transistor in response to the first gate signal in the address-scan period. The bias transistor may provide one of the bias voltages to the first electrode of the driving transistor in response to the second gate signal in the self-scan period.

A display device according to embodiments includes: a display panel, which includes a first display area having a first pixel density and including a plurality of first pixels and a second display area having a second pixel density lower than the first pixel density and including a plurality of second pixels; a gate driver, which provides a first gate signal and a second gate signal to each of the first and second pixels; and a data driver, which provides data voltages to the first and second pixels in an address-scan period and provides a first bias voltage and a second bias voltage different from the first bias voltage to the first display area and the second display area, respectively, in a self-scan period following the address-scan period.

In an embodiment, the second display area may further include at least one transmitting portion, which transmits external light incident onto the display panel.

In an embodiment, the display panel may further include a third display area having a third pixel density lower than the first pixel density, spaced apart from the second display area, and including a plurality of third pixels.

In an embodiment, the display panel may further include data lines, which connect the first and second pixels to the data driver, apply the data voltages to the first and second pixels in the address-scan period, and apply the first bias voltage and the second bias voltage to the first pixels and the second pixels, respectively, in the self-scan period.

In an embodiment, the data driver includes: a memory, which stores image data corresponding to the data voltages; a look-up table, which stores position information of the first display area, position information of the second display area, a first bias voltage value corresponding to the first bias voltage, and a second bias voltage value corresponding to the second bias voltage; a bias determiner, which determines bias data from the look-up table; a multiplexer, which selects the image data as output data in the address-scan period and selects the bias data as the output data in the self-scan period; a digital-to-analog converter, which converts the output data into data signals; and buffers, which output the data signals to the data lines, respectively.

An electronic apparatus according to embodiments includes: a display device which displays an image; and an optical device which overlaps the display device and detects external light incident onto the display device. The display device includes: a display panel, which includes a first display area having a first pixel density and including a plurality of first pixels and a second display area having a second pixel density lower than the first pixel density and including a plurality of second pixels; a gate driver, which provides a first gate signal and a second gate signal to each of the first and second pixels; and a data driver which, provides data voltages to the first and second pixels in an address-scan period and provides a first bias voltage and a second bias voltage different from the first bias voltage to the first display area and the second display area, respectively, in a self-scan period following the address-scan period.

In an embodiment, the optical device may overlap the second display area.

In an embodiment, the optical device may include at least one of a camera module and a light sensor module.

In the display device and the electronic apparatus according to the embodiments, the data driver may provide different bias voltages to the display areas having different pixel densities in the self-scan period, so that the display quality of the display device may be effectively improved.

BRIEF DESCRIPTION OF THE DRAWINGS

Illustrative, non-limiting embodiments will be more clearly understood from the following detailed description taken in conjunction with the accompanying drawings.

FIG. 11 is a table illustrating a bias voltage look-up table included in the look-up table in FIG. 9.

DETAILED DESCRIPTION

Figure 1:
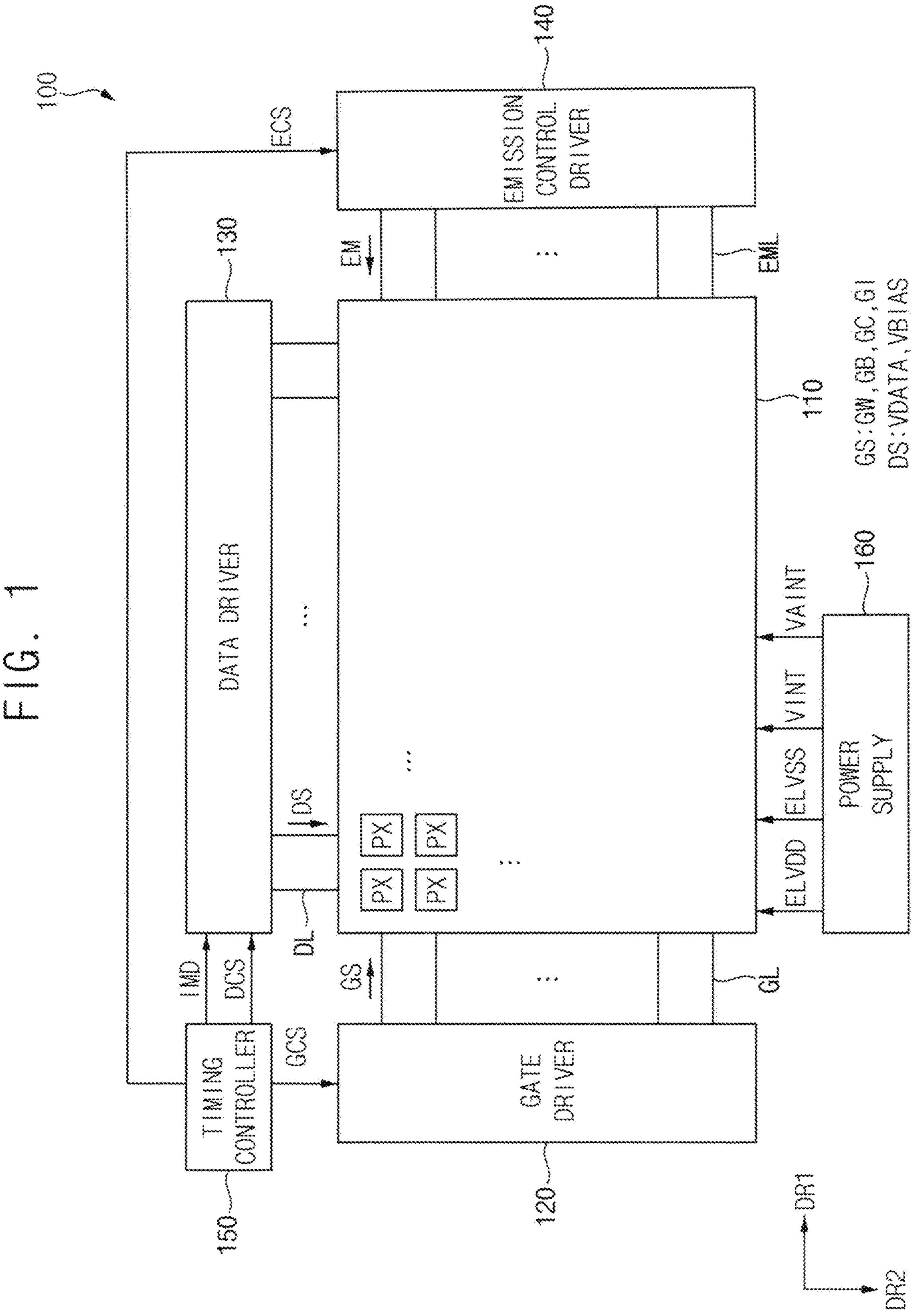
FIG. 1 is a block diagram illustrating a display device according to an embodiment.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/of" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, a display device and an electronic apparatus according to embodiments of the present disclosure will be described in more detail with reference to the accompanying drawings. The same or similar reference numerals will be used for the same elements in the accompanying drawings.

Figure 2:
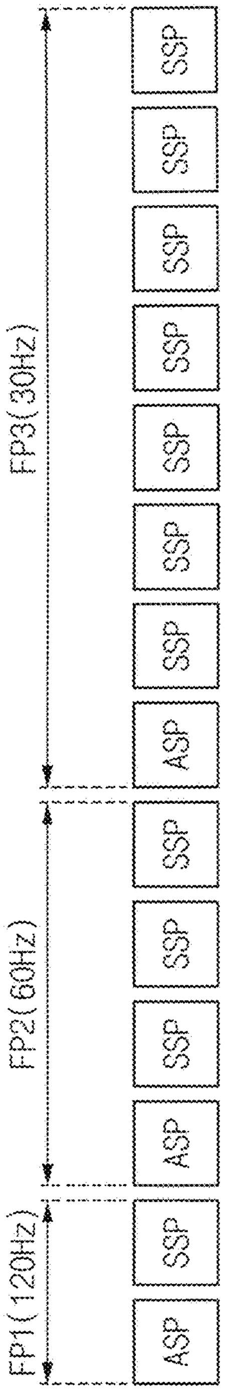
FIG. 2 is a diagram for describing an operation of the display device in FIG. 1.

FIG. 1 is a block diagram illustrating a display device 100 according to an embodiment. FIG. 2 is a diagram for describing an operation of the display device 100 in FIG. 1.

Referring to FIGS. 1 and 2, a display device 100 may include a display panel 110, a gate driver 120, a data driver 130, an emission control driver 140, a timing controller 150, and a power supply 160.

The display device 100 may be driven by a variable refresh rate ("VRR") method in which a driving frequency of the display device 100 is changed. In an embodiment, the display device 100 may be driven at a first frequency in a first frame period FP1, may be driven at a second frequency in a second frame period FP2, and may be driven at a third frequency in a third frame period FP3. For example, the first frequency may be 120 Hertz (Hz), the second frequency may be 60 Hz, and the third frequency may be 30 Hz.

A frame period may include only one address-scan period ASP, or may include at least one address-scan period ASP and at least one self-scan period SSP following the address-scan period ASP. When the driving frequency of the display device 100 is the maximum driving frequency (e.g., 240 Hz), the display device 100 may include only one address-scan period ASP. When the driving frequency of the display device 100 is less than the maximum driving frequency, the display device 100 may include one address-scan period ASP and at least one self-scan period SSP.

The number of self-scan periods SSP included in the frame period may change according to the increase or decrease of the driving frequency of the display device 100. The number of self-scan periods SSP included in the frame period may decrease as the driving frequency of the display device 100 increases, and the number of the self-scan periods SSP included in the frame period may increase as the driving frequency of the display device 100 decreases.

In the address-scan period ASP, a data voltage VDATA may be written in a driving transistor, and a light emitting diode may emit light based on a driving current corresponding to the data voltage VDATA. In the self-scan period SSP, characteristics of the driving transistor may be changed by a bias voltage VBIAS, and the light emitting diode may emit light based on the driving current corresponding to the data voltage VDATA written in the address-scan period ASP. The display device 100 may display an image based on the data voltages VDATA in the address-scan period ASP, and may maintain the image displayed in the address-scan period ASP while changing the characteristics of the driving transistor during the self-scan period SSP.

The first frame period FP1 may include one address-scan period ASP and one self-scan period SSP. Accordingly, the first frequency may be ½ of the maximum driving frequency of the display device 100. The second frame period FP2 may include one address-scan period ASP and three self-scan periods SSP. Accordingly, the second frequency may be ¼ of the maximum driving frequency of the display device 100. In the second frame period FP2, the driving frequency of the display device 100 may decrease from the first frequency to the second frequency. The third frame period FP3 may include one address-scan period ASP and seven self-scan periods SSP. Accordingly, the third frequency may be ⅛ of the maximum driving frequency of the display device 100. In the third frame period FP3, the driving frequency of the display device 100 may decrease from the second frequency to the third frequency.

The display panel 110 may include a plurality of pixels PX, a plurality of gate lines GL, a plurality of data lines DL, and a plurality of emission control lines EML. In an embodiment, the plurality of pixels PX may include red pixels for emitting red light, green pixels for emitting green light, and blue pixels for emitting blue light. A plurality of pixel rows and a plurality of pixel columns may be defined by the pixels PX. For example, each of the pixel rows may extend in a first direction DR1, and the pixel rows may be arranged in a second direction DR2 crossing the first direction DR1. Each of the pixel columns may extend in the second direction DR2, and the pixel columns may be arranged in the first direction DR1.

The gate lines GL may connect the pixels PX to the gate driver 120. Each of the gate lines GL may extend in the first direction DR1, and the gate lines GL may be arranged in the second direction DR2. The data lines DL may connect the pixels PX to the data driver 130. Each of the data lines DL may extend in the second direction DR2, and the data lines DL may be arranged in the first direction DR1. The emission control lines EML may connect the pixels PX to the emission control driver 140. Each of the emission control lines EML may extend in the first direction DR1, and the emission control lines EML may be arranged in the second direction DR2.

The gate driver 120 may provide gate signals GS to the pixels PX through the gate lines GL. The gate signal GS may be provided to each of the pixels PX. A gate signal GS in which a gate signal GS provided to an m−1th pixel row is shifted by one horizontal time may be provided to an mth pixel row (m is a natural number greater than or equal to 2). The gate driver 120 may generate the gate signals GS based on a first control signal GCS. The first control signal GCS may include a gate start signal, a gate clock signal, or the like.

The gate signal GS may include a first gate signal GW, a second gate signal GB, a third gate signal GC, and a fourth gate signal GI. In an embodiment, the first gate signal GW and the second gate signal GB may have the same frequency as the maximum driving frequency of the display device 100, and the third gate signal GC and the fourth gate signal GI may have the same frequency as the driving frequency of the display device 100. In another embodiment, the second gate signal GB may have the same frequency as the maximum driving frequency of the display device 100, and the first gate signal GW, the third gate signal GC, and the fourth gate signal GI may have the same frequency as the driving frequency of the display device 100.

The data driver 130 may provide data signals DS to the pixels PX through the data lines DL. The data signal DS may be provided to each of the pixels PX. The data driver 130 may generate the data signals DS based on image data IMD and a second control signal DCS. The image data IMD may include grayscale values corresponding to the pixels PX. The second control signal DCS may include a data start signal, a data clock signal, a load signal, or the like.

The data signal DS may include the data voltage VDATA in the address-scan period ASP, and may include the bias voltage VBIAS in the self-scan period SSP. In other words, the data driver 130 may provide the data voltage VDATA to each of the pixels PX in the address-scan period ASP, and may provide the bias voltage VBIAS to each of the pixels PX in the self-scan period SSP.

The emission control driver 140 may provide emission control signals EM to the pixels PX through the emission control lines EML. The emission control signal EM may be provided to each of the pixels PX. An emission control signal EM in which an emission control signal EM provided to the m−1th pixel row is shifted by one horizontal time may be provided to the mth pixel row. The emission control driver 140 may generate the emission control signal EM based on a third control signal ECS. The third control signal ECS may include an emission control start signal, an emission control clock signal, or the like. In an embodiment, the emission control signal EM may have the same frequency as the maximum driving frequency of the display device 100.

The timing controller 150 may control an operation of the gate driver 120, an operation of the data driver 130, and an operation of the emission control driver 140. The timing controller 150 may generate the image data IMD, the first control signal GCS, the second control signal DCS, and the third control signal ECS based on an image signal and a control signal which are applied from the outside.

The power supply 160 may provide a driving voltage ELVDD, a common voltage ELVSS, first initialization voltages VINT, and second initialization voltages VAINT to the pixels PX. The driving voltage ELVDD, the common voltage ELVSS, the first initialization voltage VINT, and the second initialization voltage VAINT may be provided to each of the pixels PX.

Figure 3:
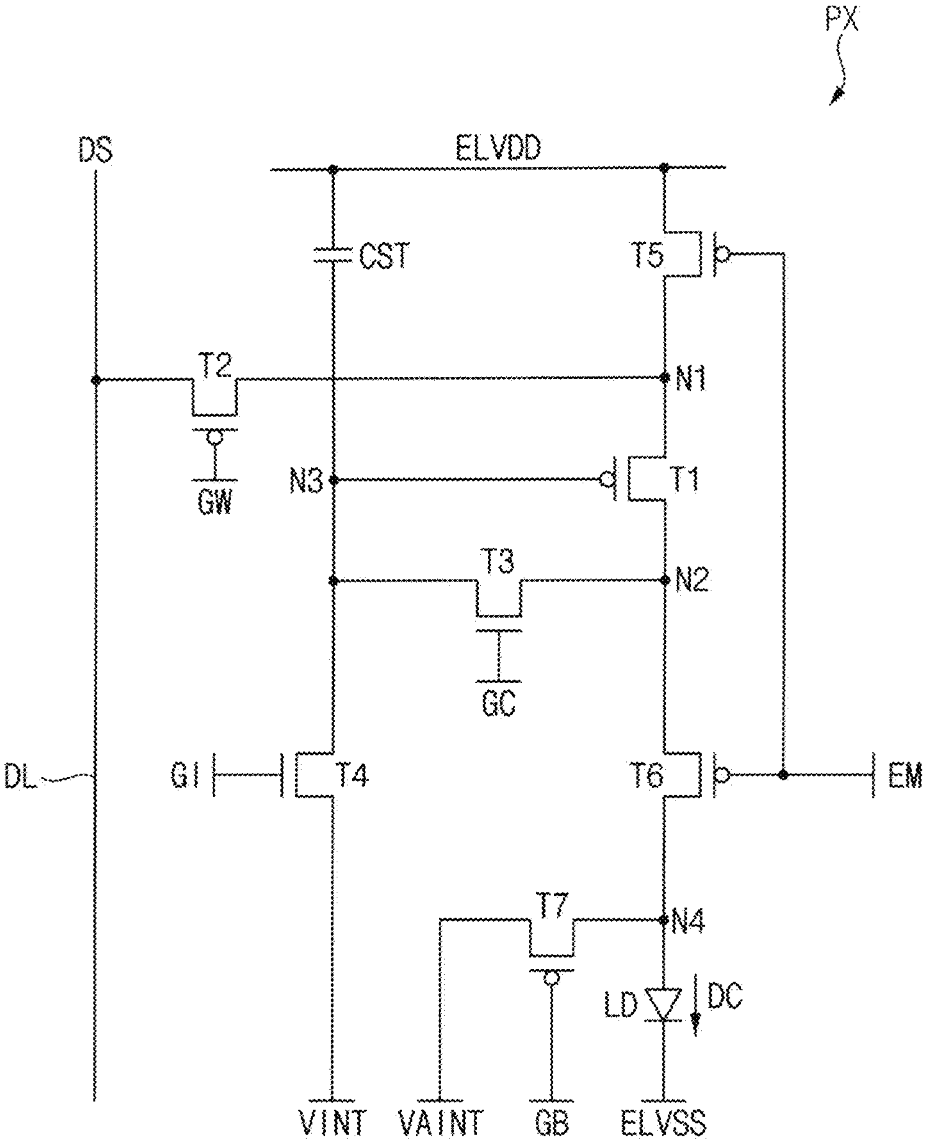
FIG. 3 is a circuit diagram illustrating a pixel according to an embodiment.
Figure 4:
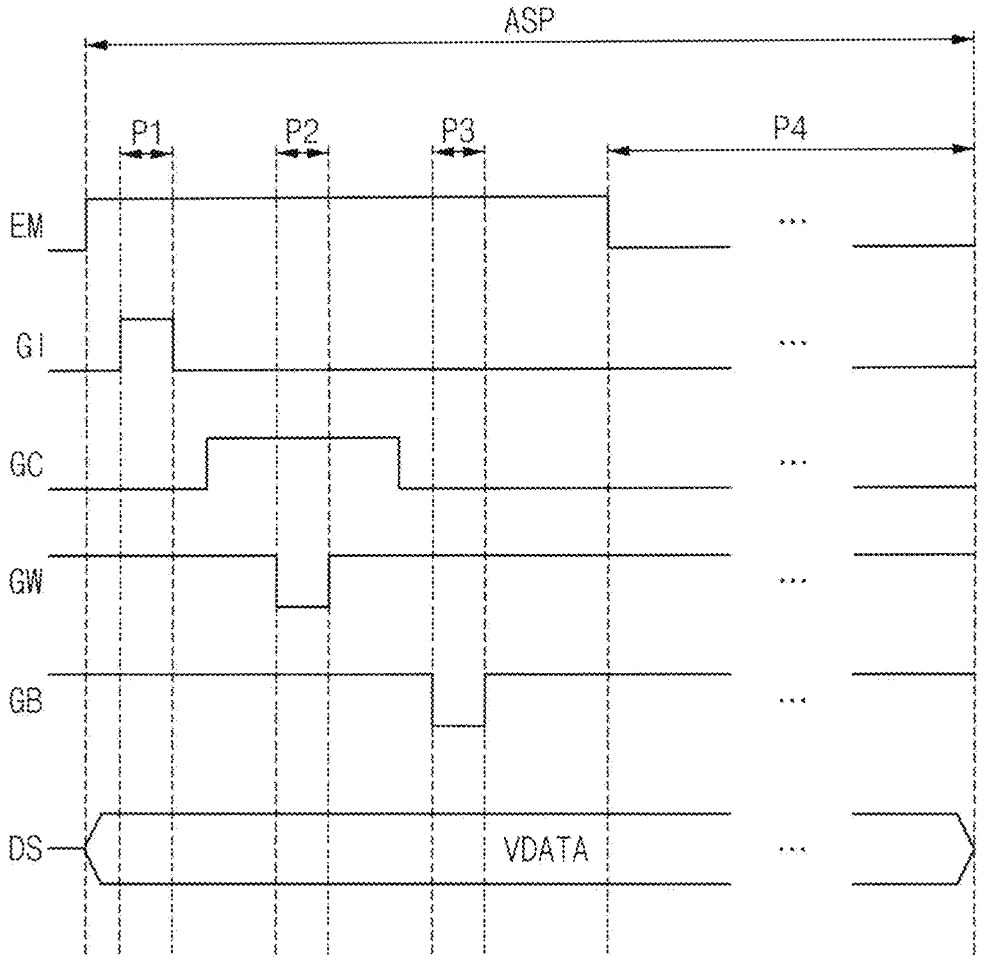
FIGS. 4 and 5 are diagrams for describing an operation of the pixel in FIG. 3.
Figure 5:
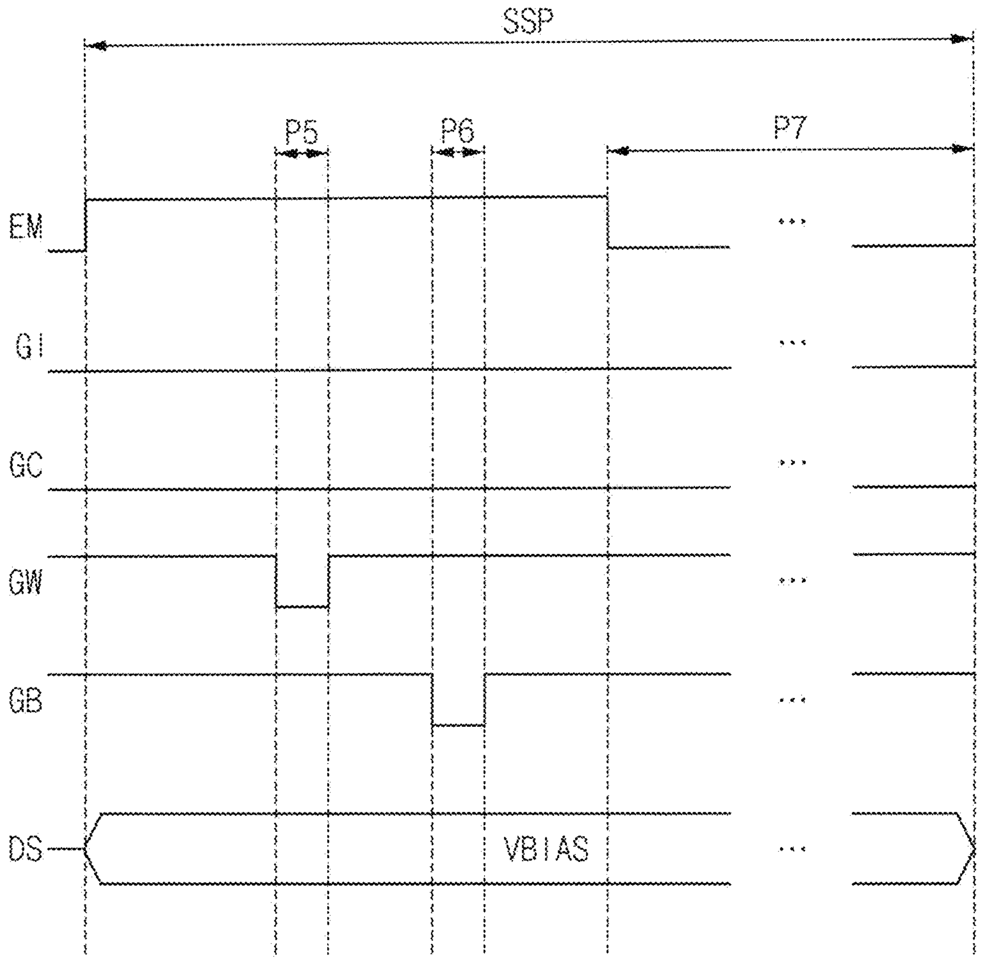

FIG. 3 is a circuit diagram illustrating a pixel PX according to an embodiment. FIGS. 4 and 5 are diagrams for describing an operation of the pixel PX in FIG. 3.

Referring to FIGS. 3, 4, and 5, the pixel PX may include a plurality of transistors, at least one capacitor, and a light emitting diode LD. In an embodiment, the plurality of transistors may include a first transistor T1, a second transistor T2, a third transistor T3, a fourth transistor T4, a fifth transistor T5, a sixth transistor T6, and a seventh transistor T7, and the at least one capacitor may include a storage capacitor CST.

A first electrode of the first transistor T1 may be connected to a first node N1, and a second electrode of the first transistor T1 may be connected to a second node N2. A gate electrode of the first transistor T1 may be connected to a third node N3. The first transistor T1 may generate a driving current DC based on a voltage between the third node N3 and the first node N1. The first transistor T1 may be referred to as a "driving transistor".

A first electrode of the second transistor T2 may be connected to the data line DL that transmits the data signal DS, and a second electrode of the second transistor T2 may be connected to the first node N1. Agate electrode of the second transistor T2 may be connected to a first gate line that transmits the first gate signal GW. The second transistor T2 may write the data signal DS to the first node N1 in response to the first gate signal GW. The second transistor T2 may be referred to as a "write transistor".

A first electrode of the third transistor T3 may be connected to the second node N2, and a second electrode of the third transistor T3 may be connected to the third node N3. A gate electrode of the third transistor T3 may be connected to a third gate line that transmits the third gate signal GC. The third transistor T3 may electrically connect the second electrode and the gate electrode of the first transistor T1 in response to the third gate signal GC.

A first electrode of the fourth transistor T4 may be connected to a first initialization voltage line that transmits the first initialization voltage VINT, and a second electrode of the fourth transistor T4 may be connected to the third node N3. A gate electrode of the fourth transistor T4 may be connected to a fourth gate line that transmits the fourth gate signal GI. The fourth transistor T4 may initialize the third node N3 with the first initialization voltage VINT in response to the fourth gate signal GI.

A first electrode of the fifth transistor T5 may be connected to a driving voltage line that transmits the driving voltage ELVDD, and a second electrode of the fifth transistor T5 may be connected to the first node N1. A gate electrode of the fifth transistor T5 may be connected to the emission control line EML that transmits the emission control signal EM. The fifth transistor T5 may electrically connect the driving voltage line and the first node N1 in response to the emission control signal EM.

A first electrode of the sixth transistor T6 may be connected to the second node N2, and a second electrode of the sixth transistor T6 may be connected to a fourth node N4. A gate electrode of the sixth transistor T6 may be connected to the emission control line EML. The sixth transistor T6 may electrically connect the second node N2 and the fourth node N4 in response to the emission control signal EM.

A first electrode of the seventh transistor T7 may be connected to a second initialization voltage line that transmits the second initialization voltage VAINT, and a second electrode of the seventh transistor T7 may be connected to the fourth node N4. A gate electrode of the seventh transistor T7 may be connected to a second gate line that transmits the second gate signal GB. The seventh transistor T7 may initialize the fourth node N4 with the second initialization voltage VAINT in response to the second gate signal GB.

In an embodiment, each of the first transistor T1, the second transistor T2, the fifth transistor T5, the sixth transistor T6, and the seventh transistor T7 may be a P-type transistor (e.g., a PMOS transistor), and each of the third transistor T3 and the fourth transistor T4 may be an N-type transistor (e.g., an NMOS transistor). In such an embodiment, a gate-on voltage of each of the first transistor T1, the second transistor T2, the fifth transistor T5, the sixth transistor T6, and the seventh transistor T7 may be a logic low voltage, and a gate-on voltage of each of the third transistor T3 and the fourth transistor T4 may be a logic high voltage.

A first electrode of the storage capacitor CST may be connected to the third node N3, and a second electrode of the storage capacitor CST may be connected to the driving voltage line. The storage capacitor CST may store a voltage of the third node N3.

A first electrode of the light emitting diode LD may be connected to the fourth node N4, and a second electrode of the light emitting diode LD may be connected to a common voltage line that transmits the common voltage ELVSS. The light emitting diode LD may emit light based on the driving current DC. The light emitting diode LD may emit light having a luminance corresponding to the driving current DC.

The address-scan period ASP may include a first period P1, a second period P2, a third period P3, and a fourth period P4. In the first period P1, the fourth transistor T4 may be turned on in response to the gate-on voltage of the fourth gate signal GI, and the first initialization voltage VINT may be applied to the third node N3. Accordingly, the gate electrode of the first transistor T1 may be initialized in the first period P1.

In the second period P2, the third transistor T3 may be turned on in response to the gate-on voltage of the third gate signal GC, and the first transistor T1 may be diode-connected. Further, in the second period P2, the second transistor T2 may be turned on in response to the gate-on voltage of the first gate signal GW, and the data voltage VDATA for which a threshold voltage of the first transistor T1 is compensated may be applied to the third node N3. Accordingly, the data voltage VDATA for which the threshold voltage of the first transistor T1 is compensated may be written in the storage capacitor CST in the second period P2.

In the third period P3, the seventh transistor T7 may be turned on in response to the gate-on voltage of the second gate signal GB, and the second initialization voltage VAINT may be applied to the fourth node N4. Accordingly, the first electrode of the light emitting diode LD may be initialized in the third period P3.

In the fourth period P4, the fifth transistor T5 and the sixth transistor T6 may be turned on in response to the gate-on voltage of the emission control signal EM, and the driving current DC corresponding to a voltage between the gate electrode and the first electrode of the first transistor T1 may flow through the light emitting diode LD. Accordingly, in the fourth period P4, the light emitting diode LD may emit light having a luminance corresponding to the driving current DC.

The self-scan period SSP may include a fifth period P5, a sixth period P6, and a seventh period P7. In the fifth period P5, the second transistor T2 may be turned on in response to the gate-on voltage of the first gate signal GW, and the bias voltage VBIAS may be applied to the first node N1. Accordingly, in the fifth period P5, the bias voltage VBIAS may be applied to the first electrode of the first transistor T1, and the first transistor T1 may be on-biased. When a driving time of the first transistor T1 increases, the characteristic of the first transistor T1 may be fixed to a predetermined state, and a luminance of light emitted from the light emitting diode LD may increase or decrease due to the shift of the threshold voltage of the first transistor T1 and the hysteresis characteristic of the first transistor T1. As the first transistor T1 is on-biased by the bias voltage VBIAS in the fifth period P5, the characteristic of the first transistor T1 may be changed, and accordingly, it is possible to prevent the luminance of light emitted from the light emitting diode LD from increasing or decreasing due to the shift of the threshold voltage of the first transistor T1 and the hysteresis characteristics of the first transistor T1.

In the sixth period P6, the seventh transistor T7 may be turned on in response to the gate-on voltage of the second gate signal GB, and the second initialization voltage VAINT may be applied to the fourth node N4. Accordingly, the first electrode of the light emitting diode LD may be initialized in the sixth period P6.

In the seventh period P7, the fifth transistor T5 and the sixth transistor T6 may be turned on in response to the gate-on voltage of the emission control signal EM, and the driving current DC corresponding to the voltage between the gate electrode and the first electrode of the first transistor T1 may flow through the light emitting diode LD. Accordingly, in the seventh period P7, the light emitting diode LD may emit light based on the driving current DC corresponding to the data voltage VDATA written in the storage capacitor CST in the address-scan period ASP.

Figure 6:
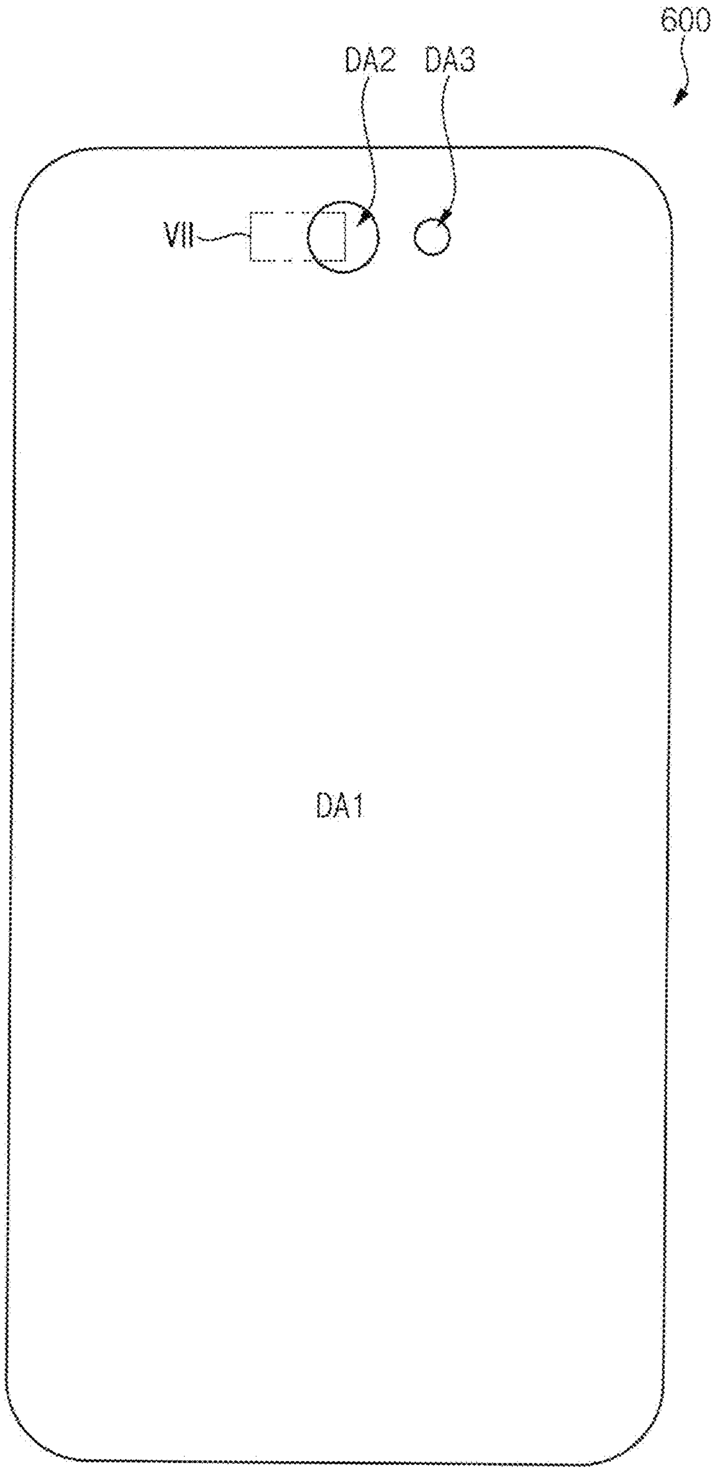
FIG. 6 is a plan view illustrating a display panel according to an embodiment.
Figure 7:
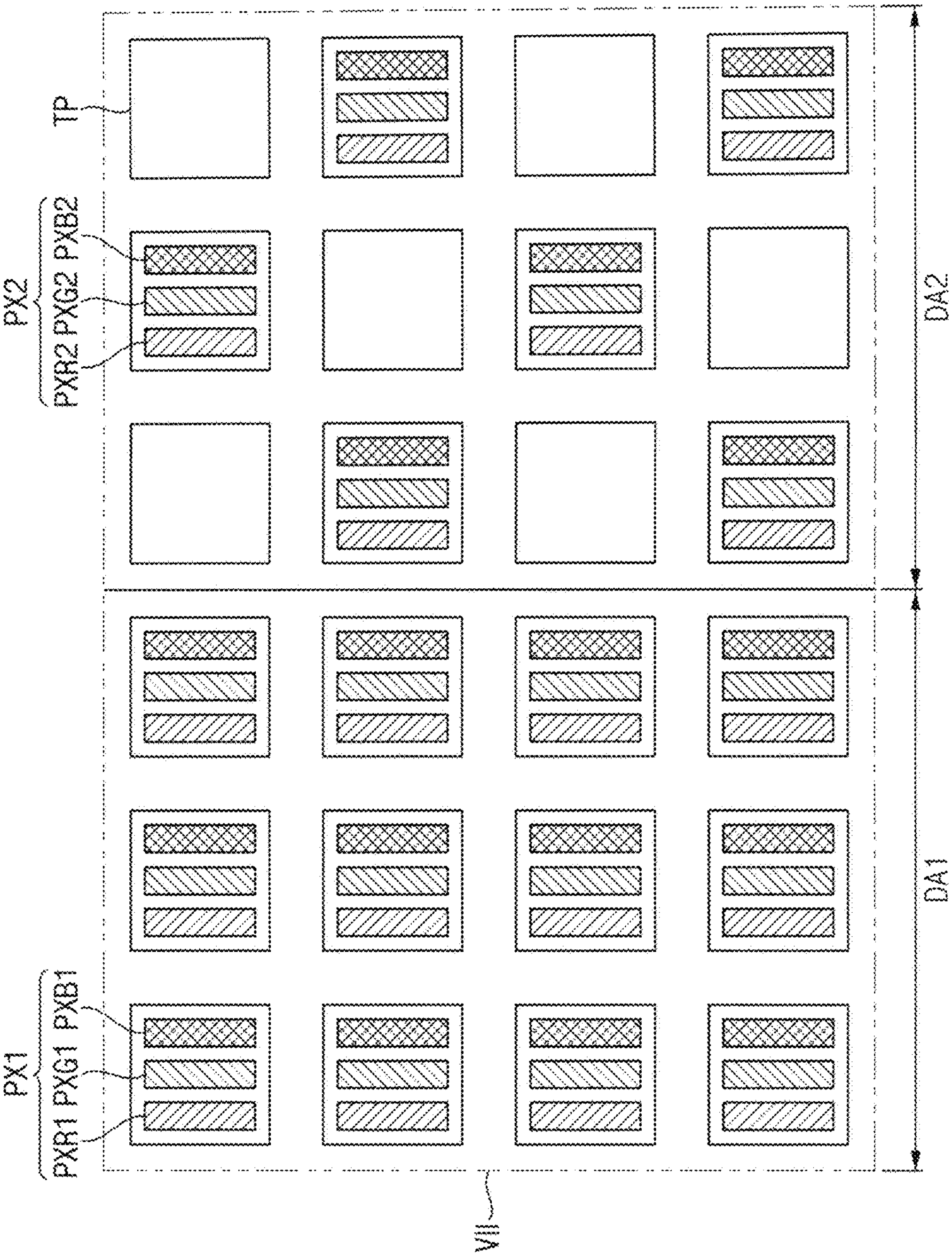
FIG. 7 is an enlarged plan view illustrating an area VII in FIG. 6.

FIG. 6 is a plan view illustrating a display panel 600 according to an embodiment. FIG. 7 is an enlarged plan view illustrating an area VII in FIG. 6.

Referring to FIGS. 6 and 7, the display panel 600 may include a plurality of display areas. In an embodiment, the display panel 600 may include a first display area DA1, a second display area DA2, and a third display area DA3. However, the present disclosure is not limited thereto, and in another embodiment, the display panel 600 may include two or four or more display areas. Hereinafter, for convenience of description, it will be described that the display panel 600 includes three display areas DA1, DA2, and DA3.

The first display area DA1 may include first pixels PX1. The first display area DA1 may display an image through the first pixels PX1. The second display area DA2 may include second pixels PX2 and at least one transmitting portion TP, and the third display area DA3 may include third pixels and at least one transmitting portion. The transmitting portion TP may transmit external light incident onto the display panel 600. The second display area DA2 may display an image through the second pixels PX2, and may transmit external light through the transmitting portion TP. The third display area DA3 may display an image through the third pixels, and may transmit external light through the transmitting portion. In an embodiment, the first pixels PX1 may include red pixels PXR1, green pixels PXG1, and blue pixels PXB1, the second pixels PX2 may include red pixels PXR2, green pixels PXG2, and blue pixels PXB2, and the third pixels may include red pixels, green pixels, and blue pixels.

In an embodiment, the second display area DA2 and the third display area DA3 may be positioned in the first display area DA1 in a plan view, and the second display area DA2 and the third display area DA3 may be spaced apart from each other. For example, the second display area DA2 may have a circular planar shape having a predetermined size, and the third display area DA3 may have a circular planar shape having a size smaller than the size of the second display area D2.

The first to third display areas DA1, DA2, and DA3 may have different pixel densities. The pixel density may be the number of pixels per unit area. In an embodiment, the second display area DA2 may have a second pixel density lower than a first pixel density of the first display area DA1, and the third display area DA3 may have a third pixel density lower than the first pixel density. In such an embodiment, each of the number of second pixels PX2 per unit area and the number of third pixels per unit area may be smaller than the number of first pixels PX1 per unit area.

When the second pixel PX2 and the third pixel emit light with substantially the same luminance as the luminance of the first pixel PX1, since the second pixel density and the third pixel density are lower than the first pixel density, a luminance of the second display area DA2 and a luminance of the third display area DA3 may be lower than a luminance of the first display area DA1. Accordingly, in order to make the luminance of the second display area DA2 and the luminance of the third display area DA3 substantially equal to the luminance of the first display area DA1, the first initialization voltage VINT, the second initialization voltage VAINT, and the bias voltage VBIAS provided to the second pixel PX2 and the first initialization voltage VINT, the second initialization voltage VAINT, and the bias voltage VBIAS provided to the third pixel may be different from the first initialization voltage VINT, the second initialization voltage VAINT, and the bias voltage VBIAS provided to the first pixel PX1, respectively.

Figure 8:
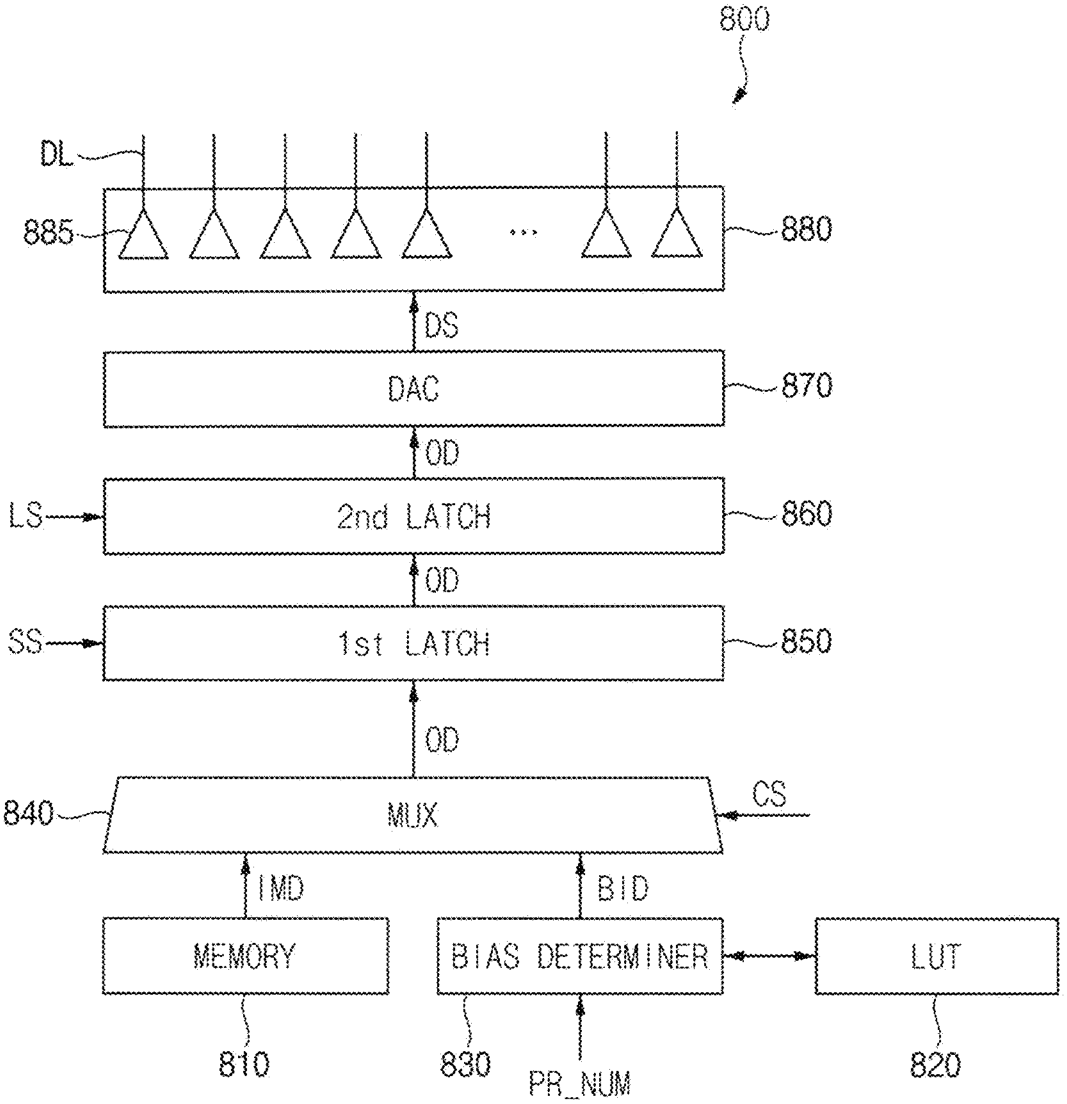
FIG. 8 is a block diagram illustrating a data driver according to an embodiment.
Figures 9, 10:
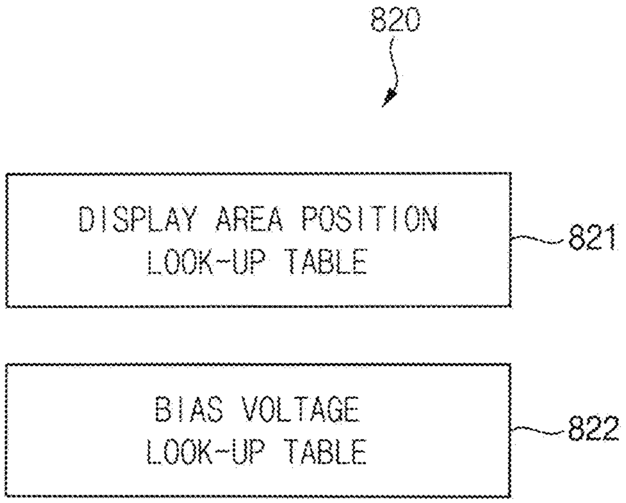
FIG. 9 is a block diagram illustrating a look-up table included in the data driver in FIG. 8.
FIG. 10 is a table illustrating a display area position look-up table included in the look-up table in FIG. 9.

FIG. 8 is a block diagram illustrating a data driver 800 according to an embodiment. FIG. 9 is a block diagram illustrating a look-up table 820 included in the data driver 800 in FIG. 8. FIG. 10 is a table illustrating a display area position look-up table 821 included in the look-up table 820 in FIG. 9. FIG. 11 is a table illustrating a bias voltage look-up table 822 included in the look-up table 820 in FIG. 9.

Referring to FIGS. 8, 9, 10, and 11, a data driver 800 may include a memory 810, a look-up table 820, a bias determiner 830, a multiplexer 840, a first latch unit 850, a second latch unit 860, a digital-to-analog converter 870, and a buffer unit 880.

The memory 810 may store the image data IMD provided from the timing controller 150. The image data IMD may include grayscale values corresponding to the pixels PX included in the display panel 110. In an embodiment, the memory 810 may be implemented as random access memory ("RAM").

The look-up table 820 may store position information of the display areas DA1, DA2, DA3, . . . , DAn−1, and DAn (n may be a natural number greater than or equal to 5) and bias voltage values of the display areas DA1, DA2, DA3, . . . , DAn−1, and DAn. The bias voltage values of the display areas DA1, DA2, DA3, . . . , DAn−1, and DAn may correspond to the bias voltages VBIAS respectively provided to the display areas DA1, DA2, DA3, . . . , DAn−1, and DAn. In an embodiment, the look-up table 820 may be implemented as RAM, flip-flop, or content addressable memory ("CAM").

The look-up table 820 may include a display area position look-up table 821 and a bias voltage look-up table 822. The display area position look-up table 821 may store the position information INFO_P1, INFO_P2, INFO_P3, . . . , INFO_Pn−1, and INFO_Pn of the display areas DA1, DA2, DA3, . . . , DAn−1, and DAn. The position information INFO_P1, INFO_P2, INFO_P3, . . . , INFO_Pn−1, and INFO_Pn may include shapes of the display areas DA1, DA2, DA3, . . . , DAn−1, and DAn, sizes of the display areas DA1, DA2, DA3, . . . , DAn−1, and DAn, and points of the display areas DA1, DA2, DA3, . . . , DAn−1, and DAn. For example, the second position information INFO_P2 of the second display area DA2 may include a shape (circle) of the second display area DA2, a size (radius) of the second display area DA2, and a point (origin) of the second display area DA2. For example, the first position information INFO_P1 of the first display area DA1 may include a null value, and the first display area DA1 may be defined as an area other than the second to $n^{th}$ display areas DA2, DA3, . . . , DAn−1, and DAn among the entire display area.

The bias voltage look-up table 822 may store the bias voltage values VBIAS_R1, VBIAS_R2, VBIAS_R3, . . . , VBIAS_Rn−1, VBIAS_Rn, VBIAS_G1, VBIAS_G2, VBIAS_G3, . . . , VBIAS_Gn−1, VBIAS_Gn, VBIAS_B1, VBIAS_B2, VBIAS_B3, . . . VBIAS_Bn−1, and VBIAS_Bn of the display areas DA1, DA2, DA3, . . . , Dan−1, and DAn. The first bias voltage values VBIAS_R1, VBIAS_G1, and VBIAS_B1 of the first display area DA1, the second bias voltage values VBIAS_R2, VBIAS_G2, and VBIAS_B2 of the second display area DA2, the third bias voltage values VBIAS_R3, VBIAS_G3, and VBIAS_B3 of the third display area DA3, the $n-1^{th}$ bias voltage values VBIAS_Rn−1, VBIAS_Gn−1, and VBIAS_Bn−1 of the $n-1^{th}$ display area DAn−1, and the $n^{th}$ bias voltage values VBIAS_Rn, VBIAS_Gn, and VBIAS_Bn of the $n^{th}$ display area may be different from each other.

The bias voltage values VBIAS_R1, VBIAS_R2, VBIAS_R3, . . . , VBIAS_Rn−1, VBIAS_Rn, VBIAS_G1, VBIAS_G2, VBIAS_G3, . . . , VBIAS_Gn−1, VBIAS_Gn, VBIAS_B1, VBIAS_B2, VBIAS_B3, . . . , VBIAS_Bn−1, and VBIAS_Bn may include red bias voltage values VBIAS_R1, VBIAS_R2, VBIAS_R3, . . . , VBIAS_Rn−1, and VBIAS_Rn with respect to the red pixel R, green bias voltage values VBIAS_G1, VBIAS_G2, VBIAS_G3, . . . , VBIAS_Gn−1, and VBIAS_Gn with respect to the green pixel G, and blue bias voltage values VBIAS_B1, VBIAS_B2, VBIAS_B3, . . . , VBIAS_Bn−1, and VBIAS_Bn with respect to the blue pixel B. Accordingly, different bias voltages may be applied to the pixels according to colors displayed by the pixels even in the same display area.

The bias determiner 830 may determine bias data BID from the look-up table 820. The bias determiner 830 may receive a pixel row number PR_NUM to be currently driven, and may determine the bias data BID corresponding to the pixel row number PR_NUM by referring to the display area position look-up table 821 and the bias voltage look-up table 822. For example, the bias determiner 830 may determine which display area pixels in the pixel row corresponding to the pixel row number PR_NUM are included in among the display areas DA1, DA2, DA3, . . . , DAn−1, and DAn by referring to the display area position look-up table 821, and may determine the bias voltage values provided to pixels, respectively, in the pixel row corresponding to the pixel row number PR_NUM by referring to the bias voltage look-up table 822. The bias data BID may include bias voltage values provided to the pixels, respectively, in the pixel row corresponding to the pixel row number PR_NUM.

The multiplexer 840 may select one of the image data IMD and the bias data BID as output data OD in response to a control signal CS. The control signal CS may have different values in the address-scan period ASP and the self-scan period SSP. For example, the control signal CS may have 0 in the address-scan period ASP, and may have 1 in the self-scan period SSP. The multiplexer 840 may select the image data IMD as the output data OD in response to the control signal CS having 0 in the address-scan period ASP, and may select the bias data BID as the output data OD in response to the control signal CS having 1 in the self-scan period SSP.

The first latch unit 850 may sequentially sample the output data OD corresponding to one pixel row in response to sampling signals SS. In an embodiment, the first latch unit 850 may include a plurality of first latches for sampling grayscale values, respectively, included in the output data OD corresponding to one pixel row in response to the sampling signals SS.

The second latch unit 860 may store the output data OD sampled by the first latch unit 850 in response to a load signal LS. In an embodiment, the second latch unit 860 may include a plurality of second latches corresponding to the plurality of first latches, respectively.

The digital-to-analog converter 870 may convert the digital output data OD into the analog data signals DS.

The buffer unit 880 may output the data signals DS to the data lines DL. In an embodiment, the buffer unit 880 may include a plurality of buffers 885 that output the data signals DS to the data lines DL, respectively.

Although not illustrated in FIG. 8, the data driver 800 may further include a shift register unit. The shift register unit may sequentially generate the sampling signals SS in response to the data start signal and the data clock signal. In an embodiment, the shift register unit may include a plurality of serially connected shift registers that sequentially generate the sampling signals SS by shifting the data start signal in response to the data clock signal.

Figure 12:
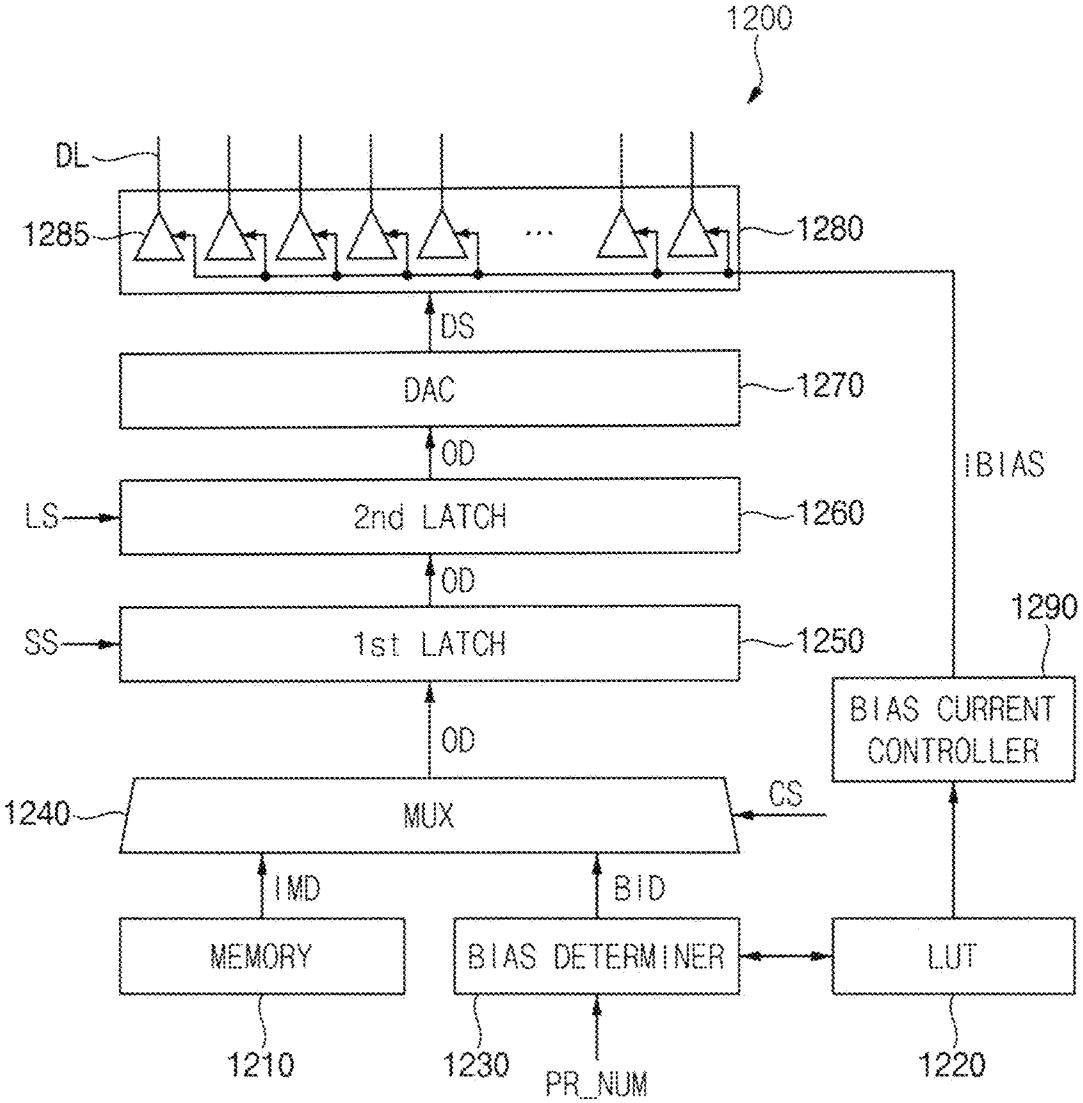
FIG. 12 is a block diagram illustrating a data driver according to another embodiment.
Figure 13:
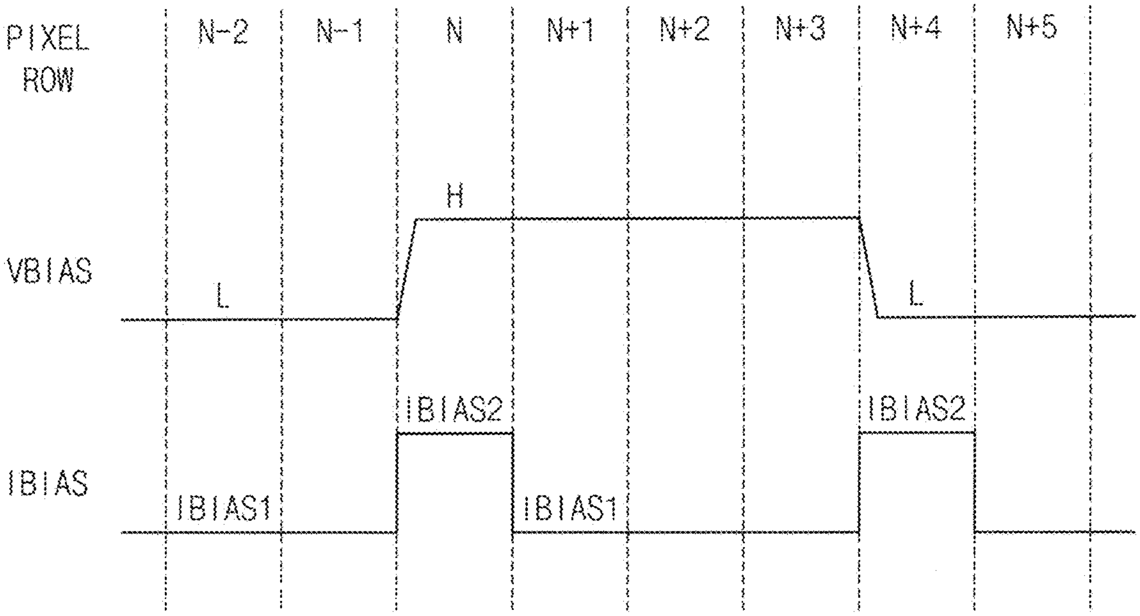
FIG. 13 is a diagram illustrating a bias current according to a change in bias voltages provided to pixel rows according to an embodiment.

FIG. 12 is a block diagram illustrating a data driver 1200 according to another embodiment. FIG. 13 is a diagram illustrating a bias current IBIAS according to a change in bias voltages VBIAS provided to pixel rows according to an embodiment.

Referring to FIGS. 12 and 13, a data driver 1200 may include a memory 1210, a look-up table 1220, a bias determiner 1230, a multiplexer 1240, a first latch unit 1250, a second latch unit 1260, a digital-to-analog converter 1270, a buffer unit 1280, and a bias current controller 1290. The data driver 1200 described with reference to FIGS. 12 and 13 may be substantially the same as or similar to the data driver 800 described with reference to FIGS. 8 to 11 except for further including the bias current controller 1290. Accordingly, descriptions of the repeated components will be omitted.

The bias current controller 1290 may control the magnitude of the bias current IBIAS provided to the buffers 1285 based on changes in the bias voltages VBIAS provided to the pixel rows.

The bias current controller 1290 may provide a first bias current IBIAS1 that is a relatively small current to the buffers 1285, when bias voltages VBIAS provided to a current pixel row are the same as bias voltages VBIAS provided to a previous pixel row. In an embodiment, the case in which the bias voltages VBIAS provided to the current pixel row are the same as the bias voltages VBIAS provided to the previous pixel row may be the case in which the bias voltages VBIAS provided to the pixels of the current pixel row, respectively, are the same as the bias voltages VBIAS provided to the pixels of the previous pixel row, respectively. For example, the bias current controller 1290 may provide the first bias current IBIAS1 to the buffers 1285 when the bias voltages VBIAS provided to the previous pixel row and the current pixel row are all low voltages L or all high voltages H. When the bias voltages VBIAS provided to the current pixel row are the same as the bias voltages VBIAS provided to the previous pixel row, since voltages of the data lines DL are the same as the bias voltages VBIAS provided to the previous pixel row, the magnitude of the bias current IBIAS provided to the buffers 1285 may decrease. The first bias current IBIAS1, which is a relatively small current, may be provided to the buffers 1285, so that power consumption of the data driver 1200 may be reduced.

The bias current controller 1290 may provide a second bias current IBIAS2 greater than the first bias current IBIAS1 to the buffers 1285 when the bias voltages VBIAS provided to the current pixel row are different from the bias voltages VBIAS provided to the previous pixel row. In an embodiment, the case in which the bias voltages VBIAS provided to the current pixel row are different from the bias voltages VBIAS provided to the previous pixel row may be the case in which at least one of the bias voltages VBIAS provided to the pixels of the current pixel row, respectively, is different from a bias voltage VBIAS provided to a pixel disposed in the same column of the previous pixel row. For example, the bias current controller 1290 may provide the second bias current IBIAS2 to the buffers 1285, when the bias voltages VBIAS provided to the previous pixel row and the current pixel row are low voltage L and high voltage H, respectively, or high voltage H and low voltage L, respectively. When the bias voltages VBIAS provided to the current pixel row are different from the bias voltages VBIAS provided to the previous pixel row, in order to rapidly apply the bias voltages VBIAS provided to the current pixel row to the data lines DL, the magnitude of the bias current IBIAS provided to the buffers 1285 may increase. The second bias current IBIAS2, which is a relatively high current, may be provided to the buffers 1285, so that the response speed of the buffers 1285 may increase, and settling time of the bias voltages VBIAS may be reduced.

Figure 14:
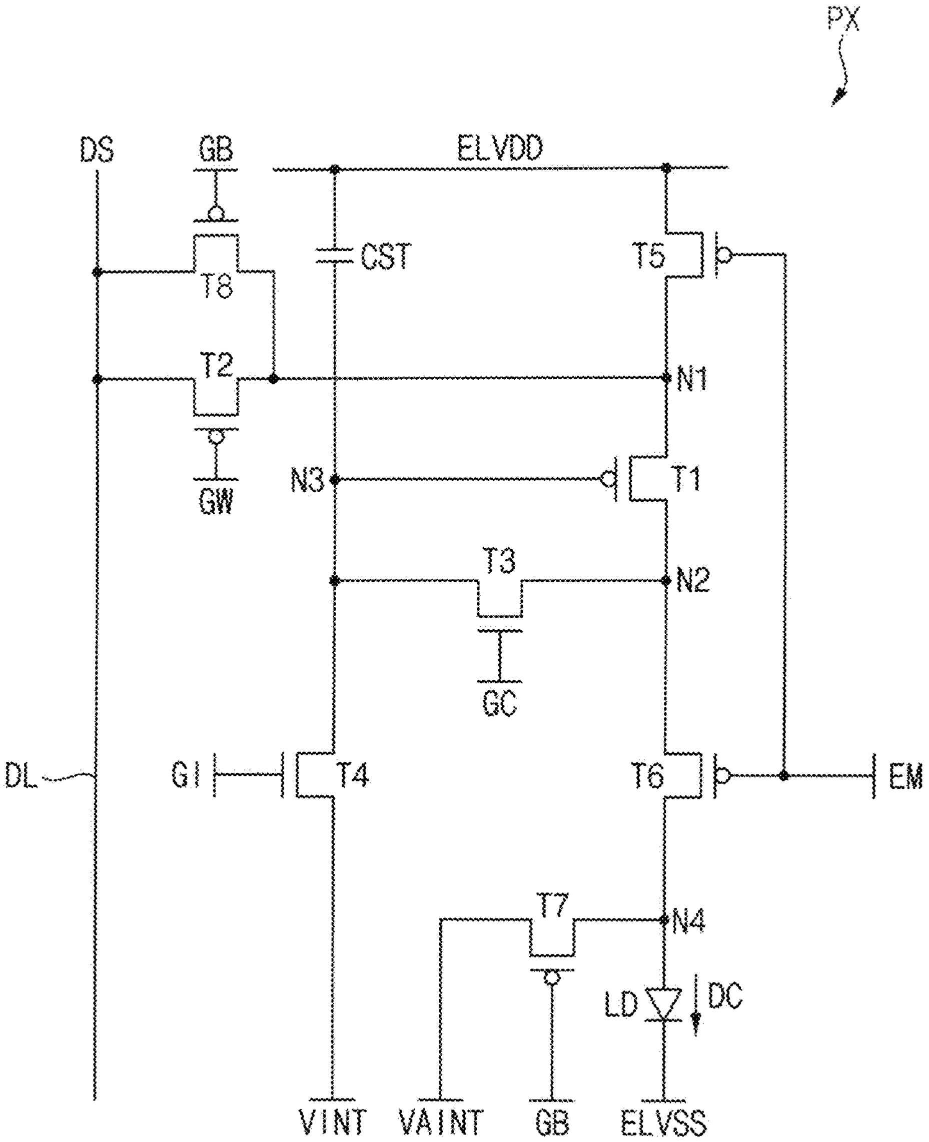
FIG. 14 is a circuit diagram illustrating a pixel according to another embodiment.
Figure 15:
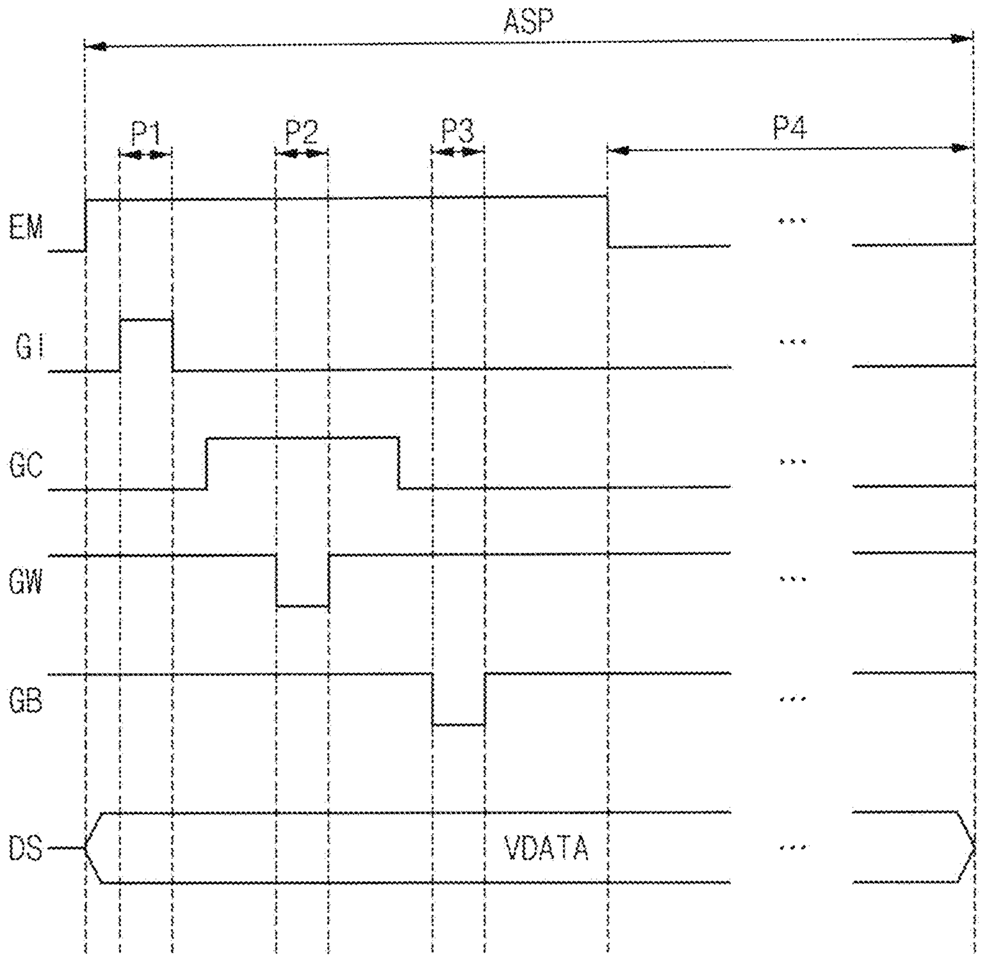
FIGS. 15 and 16 are diagrams for describing an operation of the pixel in FIG. 14.
Figure 16:
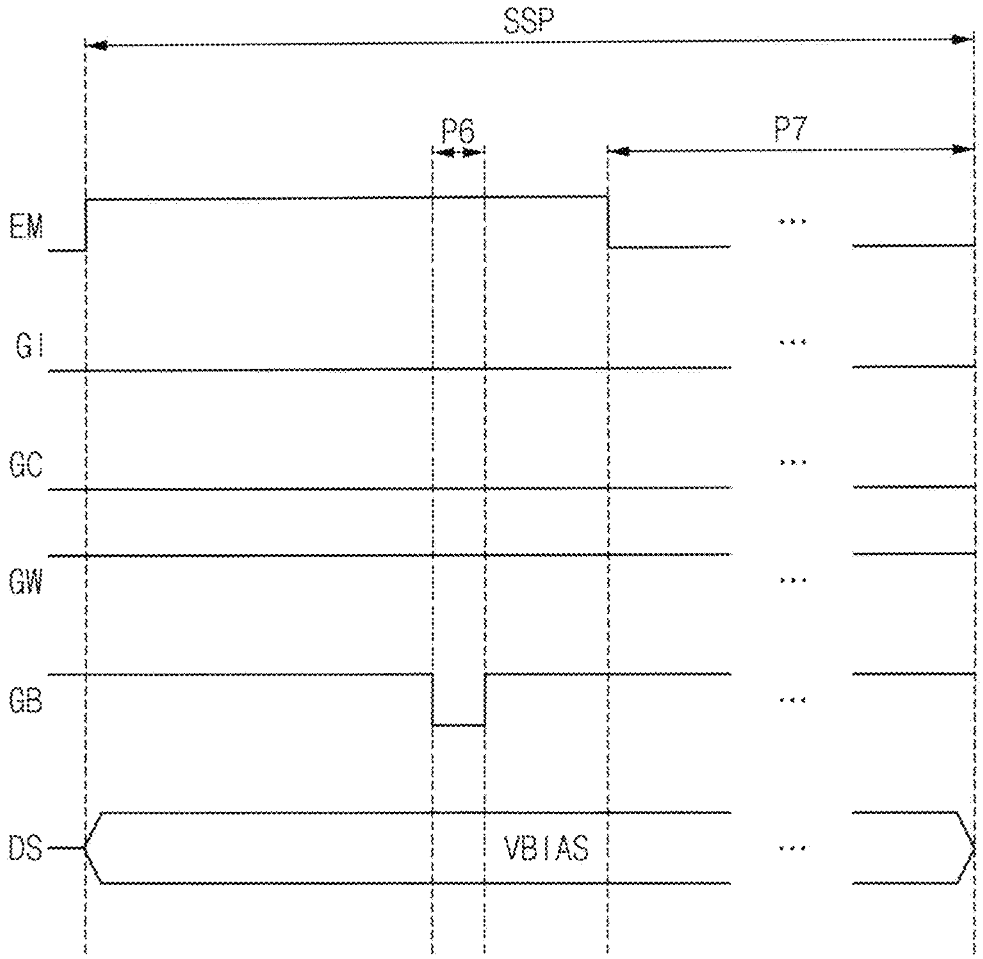

FIG. 14 is a circuit diagram illustrating a pixel PX according to an embodiment. FIGS. 15 and 16 are diagrams for describing an operation of the pixel PX in FIG. 14.

Referring to FIGS. 14, 15, and 16, a pixel PX may include a plurality of transistors, at least one capacitor, and a light emitting diode LD. In an embodiment, the plurality of transistors may include a first transistor T1, a second transistor T2, a third transistor T3, a fourth transistor T4, a fifth transistor T5, a sixth transistor T6, a seventh transistor T7, and an eighth transistor T8, and the at least one capacitor may include a storage capacitor CST. The pixel PX described with reference to FIG. 14 may be substantially the same as or similar to the pixel PX described with reference to FIG. 3 except for further including the eighth transistor T8. Accordingly, descriptions of the repeated components will be omitted.

A first electrode of the eighth transistor T8 may be connected to the data line DL that transmits the data signal DS, and a second electrode of the eighth transistor T8 may be connected to the first node N1. A gate electrode of the eighth transistor T8 may be connected to the second gate line that transmits the second gate signal GB. The eighth transistor T8 may write the data signal DS to the first node N1 in response to the second gate signal GB. The eighth transistor T8 may be referred to as a "bias transistor".

The address-scan period ASP may include a first period P1, a second period P2, a third period P3, and a fourth period P4, and the self-scan period SSP may include a sixth period P6 and a seventh period P7. The operation of the pixel PX described with reference to FIGS. 15 and 16 may be substantially the same as or similar to the operation of the pixel PX described with reference to FIGS. 4 and 5 except for the omission of the fifth period P5 and the sixth period P6. Accordingly, descriptions of the repeated periods will be omitted.

In the sixth period P6, the seventh transistor T7 may be turned on in response to the gate-on voltage of the second gate signal GB, and the second initialization voltage VAINT may be applied to the fourth node N4. Accordingly, the first electrode of the light emitting diode LD may be initialized in the sixth period P6. Further, in the sixth period P6, the eighth transistor T8 may be turned on in response to the gate-on voltage of the second gate signal GB, and the bias voltage VBIAS may be applied to the first node N1. Accordingly, in the sixth period P6, the bias voltage VBIAS may be applied to the first electrode of the first transistor T1, and the first transistor T1 may be on-biased. When the driving time of the first transistor T1 increases, the characteristic of the first transistor T1 may be fixed to a predetermined state, and the luminance of light emitted from the light emitting diode LD may increase or decrease due to the shift of the threshold voltage of the first transistor T1 and the hysteresis characteristic of the first transistor T1. As the first transistor T1 is on-biased by the bias voltage VBIAS in the sixth period P6, the characteristic of the first transistor T1 may be changed, and accordingly, it is possible to prevent the luminance of light emitted from the light emitting diode LD from increasing or decreasing due to the shift of the threshold voltage of the first transistor T1 and the hysteresis characteristics of the first transistor T1.

Figure 17:
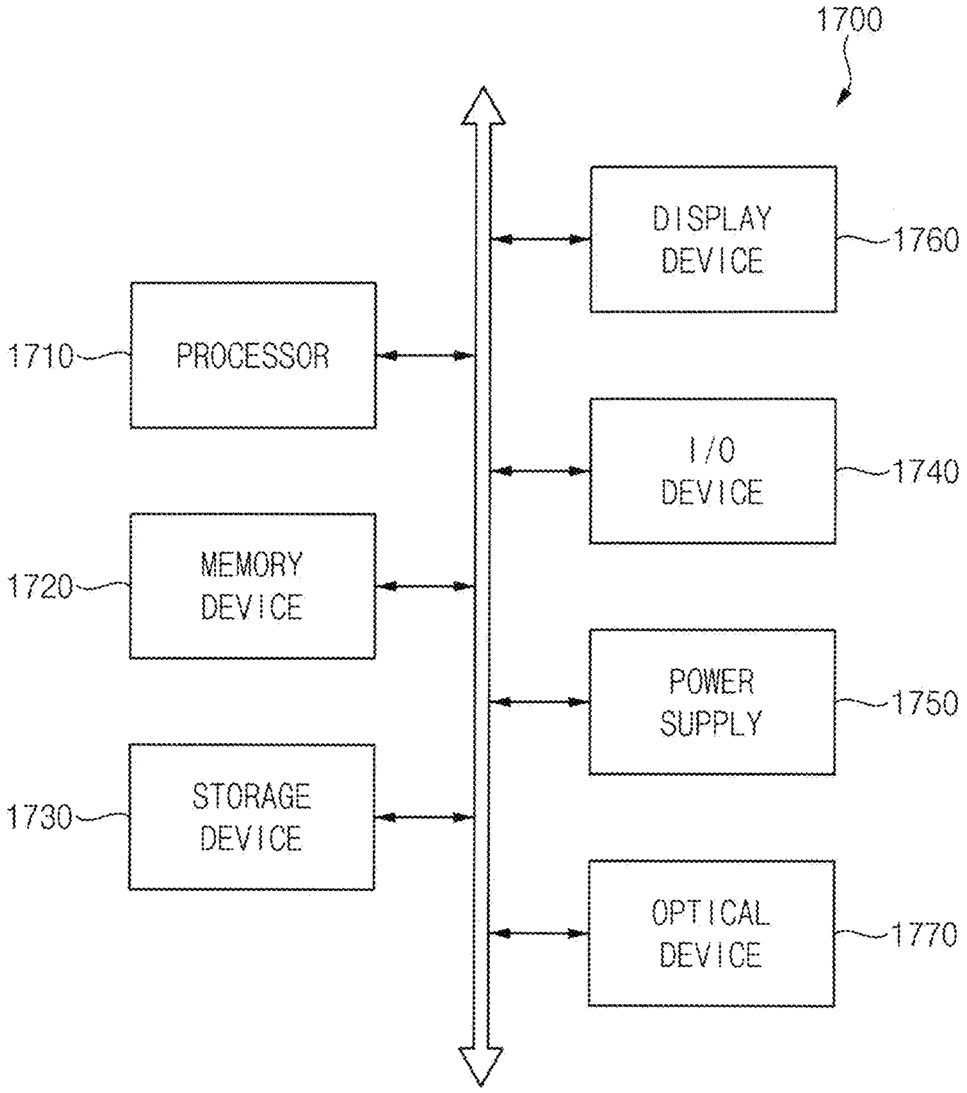
FIG. 17 is a block diagram illustrating an electronic apparatus according to an embodiment.
Figure 18:
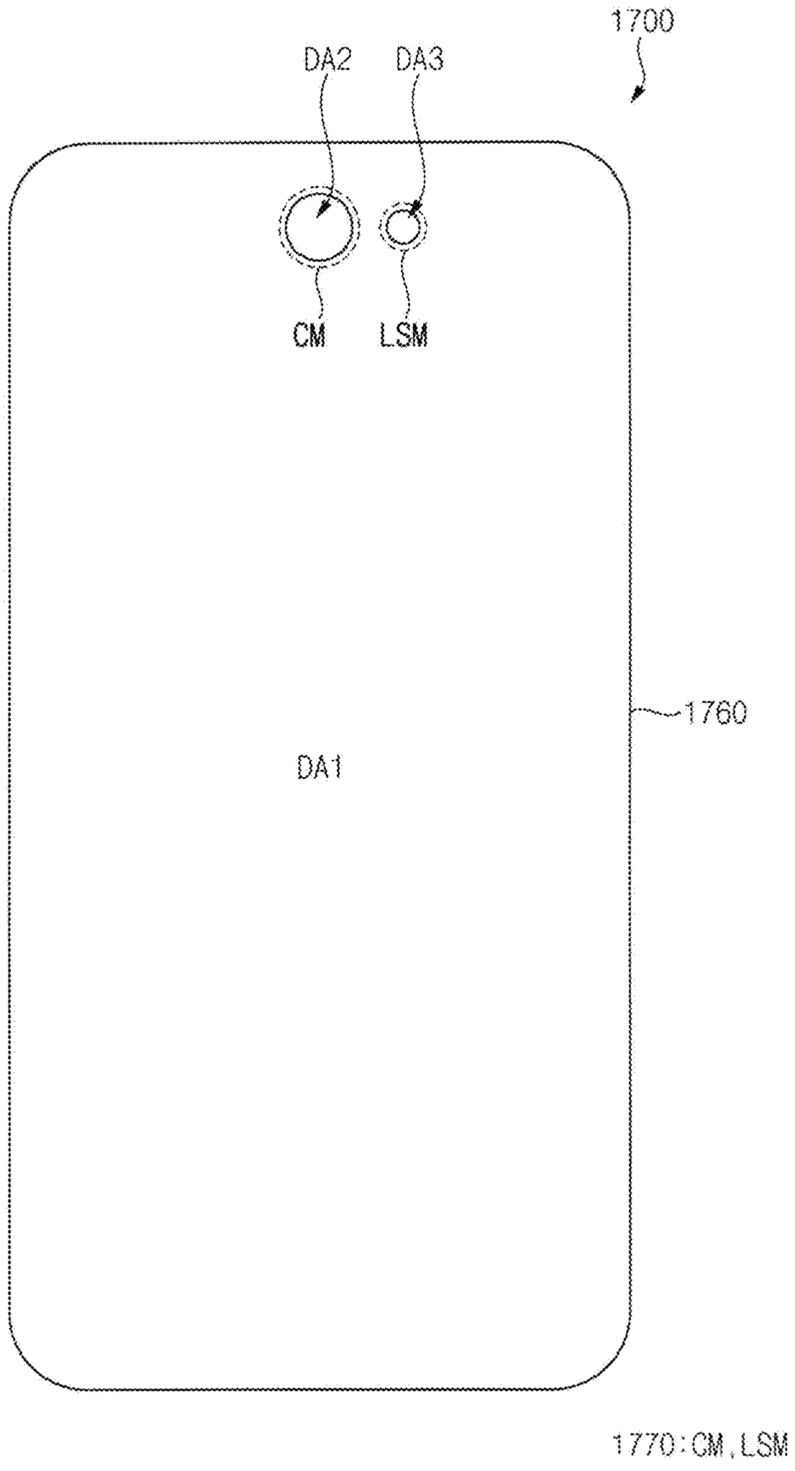
FIG. 18 is a plan view illustrating the electronic apparatus in FIG. 17.

FIG. 17 is a block diagram illustrating an electronic apparatus 1700 according to an embodiment. FIG. 18 is a plan view illustrating the electronic apparatus 1700 in FIG. 17.

Referring to FIGS. 17 and 18, an electronic apparatus 1700 may include a processor 1710, a memory device 1720, a storage device 1730, an input/output ("I/O") device 1740, a power supply 1750, a display device 1760, and an optical device 1770. The electronic apparatus 1700 may further include a plurality of ports for communicating with a video card, a sound card, a memory card, a universal serial bus ("USB") device, etc.

The processor 1710 may perform particular calculations or tasks. In an embodiment, the processor 1710 may be a microprocessor, a central processing unit ("CPU"), or the like. The processor 1710 may be coupled to other components via an address bus, a control bus, a data bus, or the like. In an embodiment, the processor 1710 may be coupled to an extended bus such as a peripheral component interconnection ("PCI") bus. The bias determiner 830 may be implemented as the processor 1710.

The memory device 1720 may store data for operations of the electronic apparatus 1700. In an embodiment, the memory device 1720 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1730 may include a solid state drive ("SSD") device, a hard disk drive ("HDD") device, a CD-ROM device, or the like. The I/O device 1740 may include an input device such as a keyboard, a keypad, a touchpad, a touchscreen, a mouse device, etc., and an output device such as a speaker, a printer, etc. The power supply 1750 may supply a power for the operation of the electronic apparatus 1700.

The display device 1760 may display an image. The display device 1760 may be coupled to other components via the buses or other communication links. The display device 1760 may be the display device 100 described with reference to FIGS. 1 to 16.

The optical device 1770 may overlap the display device 1760 in a plan view, and may detect external light incident onto the display device 1760. In an embodiment, the optical device 1770 may overlap at least one of the second display area DA2 and the third display area DA3 of the display device 1760. In an embodiment, the optical device 1770 may be disposed under a rear surface of the display device 1760.

The optical device 1770 may include at least one of a camera module CM and a light sensor module LSM. In an embodiment, the optical device 1770 may include a camera module CM overlapping the second display area DA2 and a light sensor module LSM overlapping the third display area DA3 in a plan view. In such an embodiment, the camera module CM may photograph an object in front of the display device 1760 using external light incident through the transmission portion of the second display area DA2, and the light sensor module LSM may detect an object in front of the display device 1760 using external light incident through the transmission portion of the third display area DA3.

The display device according to the embodiments may be applied to a display device included in a computer, a notebook, a mobile phone, a smart phone, a smart pad, a PMP, a PDA, an MP3 player, or the like.

Although the display devices and the electronic apparatuses according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a display panel, which includes a plurality of display areas having different pixel densities from each other, wherein each of the display areas includes a plurality of pixels;

a gate driver, which provides a first gate signal and a second gate signal to each of the pixels; and a data driver, which provides data voltages to the pixels in an address-scan period and provides different bias voltages to the display areas, respectively, in a self-scan period following the address-scan period.

2. The display device of claim 1, wherein the display panel further includes data lines, which connect the pixels to the data driver, apply the data voltages to the pixels in the address-scan period, and apply the bias voltages to the pixels in the self-scan period.

3. The display device of claim 2, wherein the data driver includes:

a memory, which stores image data corresponding to the data voltages;

a look-up table, which stores position information of the display areas and values of the bias voltages of the display areas corresponding to the bias voltages;

a bias determiner, which determines bias data from the look-up table;

a multiplexer, which selects the image data as output data in the address-scan period and selects the bias data as the output data in the self-scan period;

a digital-to-analog converter, which converts the output data into data signals; and buffers, which output the data signals to the data lines, respectively.

4. The display device of claim 3, wherein the look-up table includes:

a display area position look-up table, which stores the position information of the display areas; and a bias voltage look-up table, which stores the values of the bias voltages of the display areas.

5. The display device of claim 4, wherein the position information of the display areas includes shapes of the display areas, sizes of the display areas, and points of the display areas.

6. The display device of claim 4, wherein the values of the bias voltages of the display areas include red values of the bias voltages with respect to a red pixel of the pixels, green values of the bias voltages with respect to a green pixel of the pixels, and blue values of the bias voltages with respect to a blue pixel of the pixels.

7. The display device of claim 3, wherein the data driver further includes a bias current controller, which controls a magnitude of a bias current provided to the buffers based on a change in the bias voltages provided to pixel rows of the pixels.

8. The display device of claim 7, wherein the bias current controller provides a first bias current to the buffers when the bias voltages provided to a current pixel row of the pixel rows are the same as the bias voltages provided to a previous pixel row of the pixel rows, and provides a second bias current greater than the first bias current to the buffers when the bias voltages provided to the current pixel row are different from the bias voltages provided to the previous pixel row.

9. The display device of claim 2, wherein at least one of the pixels includes:

a light emitting diode;

a driving transistor, which provides a driving current to the light emitting diode; and a write transistor connected between a first electrode of the driving transistor and one of the data lines, and turned on in response to the first gate signal.

10. The display device of claim 9, wherein the write transistor provides one of the data voltages to a gate electrode of the driving transistor in response to the first gate signal in the address-scan period, and provides one of the bias voltages to the first electrode of the driving transistor in response to the first gate signal in the self-scan period.

11. The display device of claim 9, wherein the at least one of the pixels further includes a bias transistor connected between the first electrode of the driving transistor and the one of the data lines, and turned on in response to the second gate signal.

12. The display device of claim 11, wherein the write transistor provides one of the data voltages to a gate electrode of the driving transistor in response to the first gate signal in the address-scan period, and wherein the bias transistor provides one of the bias voltages to the first electrode of the driving transistor in response to the second gate signal in the self-scan period.

13. A display device, comprising:

a display panel, which includes a first display area having a first pixel density and including a plurality of first pixels and a second display area having a second pixel density lower than the first pixel density and including a plurality of second pixels;

a gate driver, which provides a first gate signal and a second gate signal to each of the first and second pixels; and a data driver, which provides data voltages to the first and second pixels in an address-scan period and provides a first bias voltage and a second bias voltage different from the first bias voltage to the first display area and the second display area, respectively, in a self-scan period following the address-scan period.

14. The display device of claim 13, wherein the second display area further includes at least one transmitting portion, which transmits external light incident onto the display panel.

15. The display device of claim 13, wherein the display panel further includes a third display area having a third pixel density lower than the first pixel density, spaced apart from the second display area, and including a plurality of third pixels.

16. The display device of claim 13, wherein the display panel further includes data lines, which connect the first and second pixels to the data driver, apply the data voltages to the first and second pixels in the address-scan period, and apply the first bias voltage and the second bias voltage to the first pixels and the second pixels, respectively, in the self-scan period.

17. The display device of claim 16, wherein the data driver includes:

a memory, which stores image data corresponding to the data voltages;

a look-up table, which stores position information of the first display area, position information of the second display area, a first bias voltage value corresponding to the first bias voltage, and a second bias voltage value corresponding to the second bias voltage;

a bias determiner, which determines bias data from the look-up table;

a multiplexer, which selects the image data as output data in the address-scan period and selects the bias data as the output data in the self-scan period;

a digital-to-analog converter, which converts the output data into data signals; and buffers, which output the data signals to the data lines, respectively.

18. An electronic apparatus, comprising:

a display device, which displays an image; and an optical device, which overlaps the display device and detects external light incident onto the display device, wherein the display device includes:

a display panel, which includes a first display area having a first pixel density and including a plurality of first pixels and a second display area having a second pixel density lower than the first pixel density and including a plurality of second pixels;

a gate driver, which provides a first gate signal and a second gate signal to each of the first and second pixels; and a data driver, which provides data voltages to the first and second pixels in an address-scan period and provides a first bias voltage and a second bias voltage different from the first bias voltage to the first display area and the second display area, respectively, in a self-scan period following the address-scan period.

19. The electronic apparatus of claim 18, wherein the optical device overlaps the second display area.

20. The electronic apparatus of claim 18, wherein the optical device includes at least one of a camera module and a light sensor module.

* * * * *